April 12, 1927.
H. ADLER
1,624,031
DIVIDING AND SPACING INSTRUMENT
Filed March 14, 1925        2 Sheets-Sheet 2
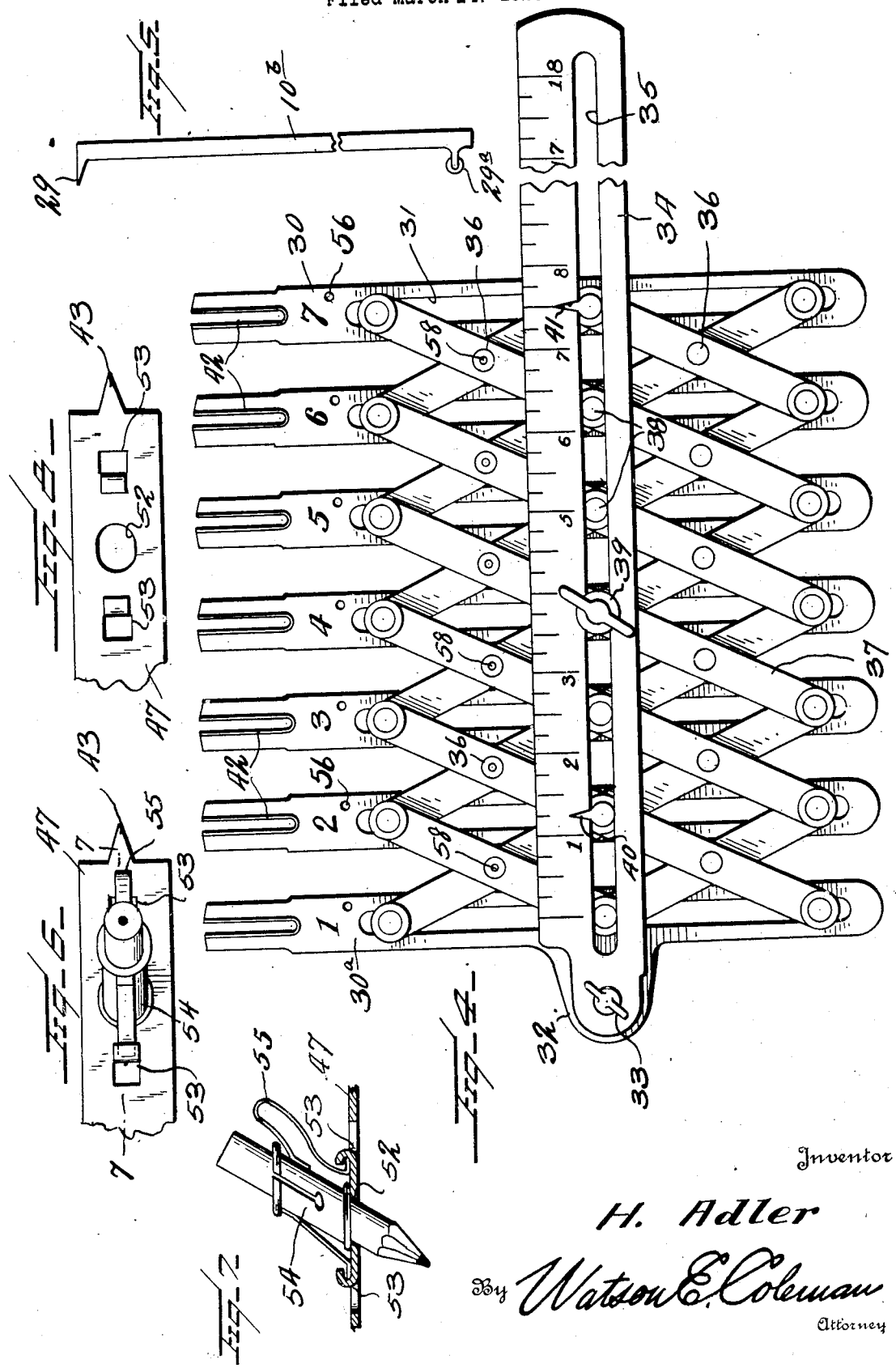
Inventor
H. Adler
By Watson E. Coleman
Attorney Patented Apr. 12, 1927.

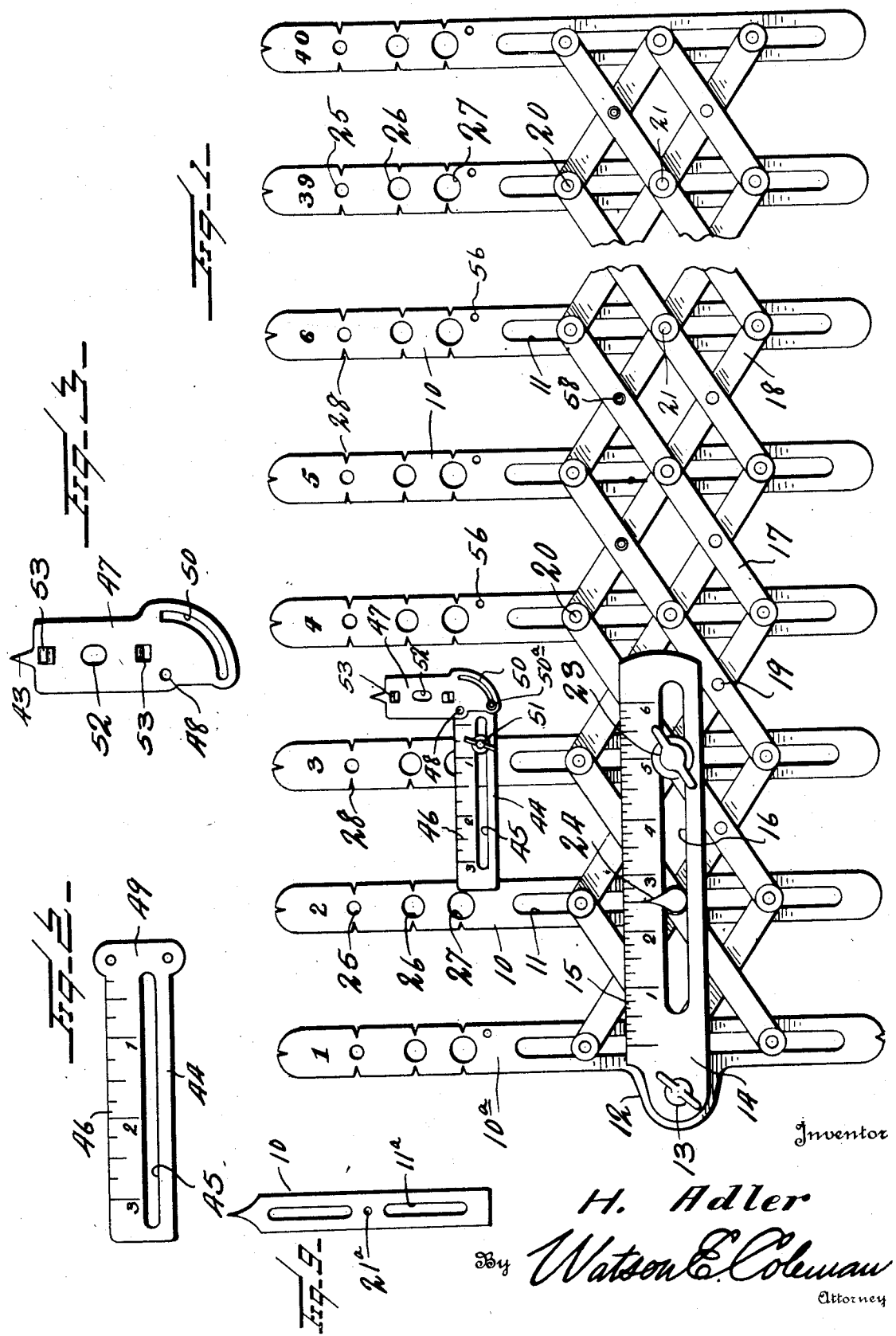

1,624,031

UNITED STATES PATENT OFFICE.

HARRY ADLER, OF MELVILLE, JOHANNESBURG, SOUTH AFRICA, ASSIGNOR OF ONE-THIRD TO FRANK ALBERT BAKER, OF MELROSE, JOHANNESBURG, SOUTH AFRICA.

DIVIDING AND SPACING INSTRUMENT.

Application filed March 14, 1925. Serial No. 15,582.

This invention relates to improvements in dividing, spacing and marking instruments, and particularly to instruments of that character wherein there are provided a plurality of marking points, indicating points or like elements which are coincidently movable into a plurality of spaced relations to each other and in which the marking points will under all circumstances be spaced an equal distance from each other.

One of the objects of the invention is to provide a measuring tool or implement which is particularly adapted to be used by untrained workmen and which is so constructed that no calculation of inches, fractional parts of an inch, meters or decimals are necessary in order to divide a certain space into a definite and equal number of divisions.

A further object is to provide a construction of this character which may be readily adjusted to give the number of equal spaces of divisions that could be obtained in a predetermined distance so that by a very simple adjustment of the implement the workman can determine how a certain space may be divided into a number of equal sections without the necessity of any calculation.

A still further object is to provide a mechanism of this character with measuring means so that the distance between the points shall be indicated on this measure and thus the actual measure of each division given.

Another and more specific object is to provide measuring instruments constructed in accordance with my invention which are particularly useful to boiler makers, riveters and the like workmen, or which by a slight modification may be used by tailors, dressmakers and others doing like work.

Still another object is to provide a construction of this character wherein parallel lines at equal distances apart may be scribed and provide, therefore, means whereby lines may be scribed at one-half or one-third of the length of the space between any two main divisions, and in this connection to provide means whereby this can be accomplished at the same time that the main divisions are marked.

Other objects will appear in the course of the following description.

My invention is illustrated in the accompanying drawing, wherein:—

Figure 1 is a plan view of one form of instrument constructed in accordance with my invention;

Figure 2 is a view of the scale used for indicating sub-divisions of the main divisions;

Figure 3 is a face view of the plate which carries the pointer and which coacts with the scale shown in Figure 2;

Figure 4 is a plan view of another form of my device;

Figure 5 is a side elevation of an indicating rod showing a modified form of the tip end of the rod;

Figure 6 is a fragmentary face view of the member 47 showing the means whereby the clip shown in Figure 7 is supported thereon;

Figure 7 is a section on the line 7—7 of Figure 6;

Figure 8 is a like view to Figure 6 but without the clip;

Figure 9 is a face view of a modified form of indicating rod;

Referring to these drawings, and particularly to Figure 1, I have illustrated in this figure an implement particularly adapted for use by riveters, boiler makers and a large number of other different trades. It will be seen from Figures 1 to 4 that my device comprises a plurality of parallel rods 10 which are illustrated as being of relatively thin strips of metal or any other suitable material, though steel is probably preferable, these rods or strips being at all times in parallel relation to each other. Each of these rods or strips is longitudinally slotted, as at 11. The end rod 10$^a$ is formed with a laterally projecting ear 12 through which a clamp screw and nut 13 pass. This clamp screw carries a rule 14 which is illustrated as divided into inches by the graduations 15, though I do not wish to be limited to this. This rule has a longitudinally extending slot 16 which is, of course, at right angles to the slots 11.

Disposed between the rule 14 and certain of the rods 10 is a lazy-tongs, this lazy-tongs flexibly connecting all of the rods 10 with each other. The lazy-tongs, as usual, consists of a plurality of parallel bars 17 extending diagonally with reference to the rods 10 and a plurality of parallel bars 18 also extending diagonally with relation to the bars 17 and to the rods 10. The bars 17 and 18 intersect each other equidistantly and are pivotally connected at their intersection by the pivots 19. The outer ends of the members 17 and 18 are pivotally connected to each other by pivot studs 20 and these provide pins which are slidably mounted in the slots 11. The middle intersection of each of the bars 17 and 18 is also provided with pins 21 which constitute pivots pivotally connecting the members 17 with the members 18 and also being slidingly engaged in the slot 11.

It will be obvious now that when the lazy-tongs is compressed, the members 20 will move outward from a center to the extremities of the slots, while the pins or members 21 will stay in the middle position in the slot. These pins 20 may be provided with rollers 22 which will engage in the slots so as to permit the easier sliding movement of these parts 20 within the slot.

The rule 14, as previously stated, is provided with a longitudinally extending slot 16, and one of the studs or pins 21 is provided with a screw-threaded recess within which the screw-threaded shank of a clamping head 23 operates so that the lazy-tongs may be clamped at any extended or contracted position. The second bar 10 counting from the bars 10ᵃ has its pin 21 preferably provided with a pointer 24 which coacts with the graduations on the rule 14. Inasmuch as the first graduation on the scale is disposed in absolute alignment with the middle or center of the bar 10ᵃ, it follows that the pointer 24 will indicate the distance between centers of each pair of the indicating rods 10, the scale 14 thus constituting means whereby the distance between any two of the indicator rods may be readily stated in either inch measurements, metric measurements or on any other form of scale.

I do not wish to be limited to the particular form of the outer ends of the rods 10. I have illustrated in Figure 1 these indicating rods as being arranged for use by boiler makers, riveters and the like operators for purposes of laying out rivets, and to this end each of these rods 10 is formed with a plurality of openings 25, 26 and 27, these openings being centered with relation to the longitudinal medial axial line of the rods, the outermost hole being of small diameter, the hole 26 of a larger diameter, and the hole 27 of a still larger diameter, and I have illustrated the measuring device itself as being adapted to be shifted to a position where there will be six inches between centers and thus there will be a difference in pitch between the rivets of six inches. Preferably the side edges of each rod 10 are notched, as at 28, on opposite sides of any one of the holes 25, 26 or 27, these notches being on a line intersecting the centers of these apertures.

In practice this construction is extended according to the number of holes required at a given distance and is placed on a chalked line known as the rivet or pitch line. The correct sized holes that would correspond to the diameter of the rivets intended to be used for the job are now placed squarely on the chalked pitch line. The V-shaped notches 27 enable this to be readily perforated and marks can be made through the holes with the certainty that the centers of the holes correspond to the pitch line. Again, assuming that it is required to mark off a number of rivet holes of a determined pitch, the number of holes not being known, it would be possible, of course, and is the ordinary practice to measure the total distance, sub-divide this distance by the determined pitch, which would give the number of rivets. My device permits this to be accomplished, however, without calculation and without the aid of a rule, compass or dividers. All that is necessary to do is to open out the instrument until the index pointer 24 indicates the required pitch or distance on the measure. The set nut 23 or head is now tightened, holding the parts exactly in their adjusted positions. The instrument is now applied to the work and the number of holes is quickly ascertained. Preferably I number the indicating rods 10 successively so that the number of rivets may be readily determined without having to count the rods.

It will be obvious that while I have illustrated in this form of my invention the rods as being formed with holes for the passage of a marking implement as, for instance, a punch or the like, and while this makes this instrument particularly adapted for riveters or like workmen, I do not wish to be limited to this as these rods might be formed with other means for indicating the placement of the rivets, screws, nails or like devices, and that each rod might be formed at its outer extremity with a scribing point, as shown in the rod marked 10ᵇ in Figure 5, the point being designated 29.

In Figure 4 I illustrate another form of my invention which is particularly adapted for use by tailors, dressmakers, but could be used in other occupations. The construction is the same as that illustrated in Figure 1 in general features but differs in detail. In this figure 30 designates the parallel bars equivalent to the bars 10 in Figure 1, these bars being formed with the longitudinally extending slots 31. One of these bars as, for instance, the bar 30ᵃ is formed with a laterally extending ear 32, and removably connected to this ear 32 by means of the wing nut 33 is a rule 34 which is longitudinally slotted, as at 35, and which may have graduations of any desired character thereon. I have shown for this purpose inch graduations.

Pivotally connected to each other by means of the rivets or like instrumentalities 36 are the crossed bars 37 which constitute a lazy-tongs, as before described. Each of these bars crosses four other bars and is pivoted to two front bars by rivets 36, and at the intersection of the rods 30 with these bars the bars are pivoted to each other by means of pins or equivalent devices 38 which extend through the slots 31. These pins may carry rollers or sleeves to engage with the walls of the slots 31, but ordinarily the pins will not have sufficient frictional engagement with these slots as to interfere with the free movement of the parts. One or more of those pins 38 which engage in the slot 35, as illustrated in Figure 4, is formed with a socket for the reception of a wing screw head 39 whereby a clamping action may be had upon the rule to hold the device in its set position. The second pin 38 counting from the wing nut 33 is provided with a pointer 40. The last pin 38 is also provided with a pointer 41.

It will be obvious now that the first pin 38 being fixed, then the second pin 38 counting from the left hand side in Figure 4 will be movable and will indicate the distance between the first rod 30ᵃ marked #1 and the second rod 30 marked #2, while the pointer 41 will indicate the total elongation of the instrument, that is the distance between the center of the rod #1 and the center of the rod #7. The rule 34, it will be seen, may extend to any desired length so as to give the total extension of the instrument instead of extending only a portion of the length and merely giving the distance between centers, as in Figure 1.

The rods 30 are longitudinally slotted at their ends, as at 42, so as to permit a chalk line or other mark to be drawn longitudinally of the rod, though it will be obvious that the terminal ends of these rods 30 might be constructed in any other desired manner and might be perforated, as shown in Figure 1. Here, again, it is obvious that the rods 30 might be formed with scribing points such as 29 in Figure 5, if desired, and a roller 29ᵃ at the opposite end of the rod and, as illustrated in Figure 9, either the rods 10 or the rod 30 might be pointed at the ends, as shown at 43 in Figure 3, this point, of course, being along the longitudinal axis of the rod.

The two forms of the instrument which I have explained permit the operator to mark off several lines at equal distances apart in one operation, but assuming that the operator wishes for some reason to mark an intermediate line at half the distance between two main lines or one-third the distance between two divisions and this is to be accomplished when the main division lines are marked and in one and the same operation, then I apply to the rods 10 or 30 of the instrument an indicator of the character shown in Figure 1 comprising a rule 44 having a longitudinal slot 45. This rule may be relatively short and never has a length greater than the extreme distance at which the centers of the rods 10 or 30 may be spaced from each other. This rule 44 is provided with graduations 46 and at one end is formed with a head. Pivoted to this head is a plate 47. This plate may be pivoted by a rivet, screw or equivalent member 48 passing through one corner of the head 49 of the rule 44 and is provided with a slot 50 which is concentric to the pin 48, a stop pin 50ᵃ extending up from the head 49 and through this slot so that the plate 47 may turn through a quarter circle.

This plate 47 may be made with a medially disposed opening 52 whereby a pencil or other scribing point may be disposed through the plate, or the plate may be formed with spaced, inwardly extending tongues 53 struck up from the plate for the purpose of holding a pencil clip 54, as shown in Figure 7, this pencil clip having tongues 55 insertible beneath the tongues 53 so as to hold the clip in place. I do not wish to limit myself, however, to any particular means for holding a pencil or other scribing point upon this plate 47. A like means may be used for holding pencils or other scribing points upon the rods 10 or 30.

Preferably each one of these rods 10 and each one of the rods 30 will be formed with an opening 56 through which a clamping screw 51 may be placed so as to engage the rule 44 with any one of these rods 10 or 30, and preferably the rivets or pins 19 in Figure 1 and 36 in Figure 4 will have a screw-threaded counter-sink 58 to be engaged by clamp screws 51 so as to hold the rule 44 upon these pivot pins 36 or 19 and thus support the rule in a middle position. The plate 47 may be, of course, formed with a pointer which will indicate the longitudinal axis of this plate 47.

While I have illustrated in Figures 1 and 4 the members 10 and 30 as being provided with a single longitudinally extending slot in each member, I do not wish to be limited to this, as these point indicating members might be provided with two slots, as indicated at 11ᵃ in Figure 9. Under these circumstances the center line of pivots 21 will be engaged in perforations 21ᵃ in the strips or rods. In some respects, however, it is preferable to have the slots extending longitudinally almost the entire length of the indicating rods, as this permits the indicating rods to be shifted longitudinally when the lazy-tongs is partially or fully expanded so that the ends of the point-indicating rods may be disposed in a curved line or in a zigzag relation, thus, for instance in the construction shown in Figure 1, permitting the rivets to be placed in a zigzag relation and yet evenly spaced apart.

It will be seen that my device provides an instrument so constructed that no calculation is necessary on the part of the operator either to set the marking rods or indicating rods with their centers a certain uniform distance apart or to divide a certain space into equal parts, and furthermore provides a devices which can be readily set, readily adjusted and held firmly in its adjusted position and is applicable to many different kinds of work and to a large number of different kinds of trades.

While I have illustrated certain details of construction and arrangement of parts and believe these to be particularly effective, I do not wish to be limited thereto as it is obvious that these might be changed in many ways without departing from the spirit of the invention. It will be seen that in both of my instruments I have provided a plurality of pivotal connections between the crossed strips or bars of the lazy-tongs and the parallel rods. Thus in Figure 1 each of the bars of the lazy-tongs is connected to the adjacent bars by three rivets or bolts 19 and each bar is engaged with the rod 10 through the slot 11, each rod 10 being connected to the lazy-tongs at three points. In Figure 4 the bars 37 are connected to each other at three points and at the extremities and at the middle each bar is connected to the indicating rods 30 and to the rule, the rule being connected by means of the nuts 39 and the pins 38 to the middle of each bar 37 of the lazy-tongs. The reason for this is that these middle pins 21 in Figure 1 and 38 in Figure 4 do not move but always remain in a right line, and unless the construction is such as to provide pins which only have a right line movement parallel to the rule it would impossible to apply the rule.

I claim:—

1. A dividing and spacing instrument including a series of crossed bars, each bar being pivoted at its ends and intermediate its ends to a plurality of intersecting bars to thus provide a lazy-tongs, the middle series of pivots having outwardly projecting studs and the end pivots having outwardly projecting studs, a scale having a longitudinal slot through which the middle series of studs pass, a plurality of parallel point-indicating rods extending at right angles to said scale and with which the end pivots of the lazy-tongs have sliding engagement, means disposed in connection and movable with one of said rods for indicating on the scale the space between any two rods, and clamping means engaging one of said studs and the scale, for holding the instrument and the scale in adjusted position.

2. A dividing and spacing instrument including a series of crossed bars, the bars being each pivoted at its ends and intermediate the ends to a plurality of intersecting bars to thus provide a lazy-tongs, the middle series of pivots having outwardly projecting studs and the end pivots having outwardly projecting studs, a scale having a longitudinal slot through which the middle series of studs pass, a plurality of parallel point-indicating rods extending at right angles to the scale and with which the end pivots of the lazy-tongs have sliding engagement, and means disposed in connection and movable with one of said rods for indicating on the scale the space between any two rods, means disposed in connection and movable with one end rod of the series for indicating on the scale the extreme distance between the centers of the two end rods of the series, a means for clamping the scale and lazy-tongs together to hold the lazy-tongs in adjusted relation to the scale.

3. A dividing and spacing instrument including a series of crossed bars pivoted to each other at their ends and intersections and constituting a lazy-tongs, a series of longitudinally slotted point-indicating rods extending at right angles to the direction of expansion of said lazy-tongs, the crossed bars of the lazy-tongs having engagement in said slots at a plurality of points, a scale attached to one end rod and extending over the face of the lazy-tongs, a pointer carried at the intersection of two crossed bars and the second of said rods from the point of attachment of the rule and movable over the scale to indicate the distance between the first rod of the series and the next succeeding point-indicating rod, a second pointer carried by the two end bars of the lazy-tongs remote from the point of attachment of the rule and being coincident with the end point-indicating rod, said second named pointer being movable over the scale to indicate the total distance to which the lazy-tongs has been expanded, and means engaging the lazy-tongs with said rule and clamping the lazy-tongs in any adjusted position.

4. A dividing and spacing instrument including a series of crossed bars pivoted to each other at their ends and intersections and constituting a lazy-tongs, a series of longitudinally slotted point-indicating rods extending at right angles to the direction of expansion of said lazy-tongs, the crossed bars of the lazy-tongs having engagement in said slots at a plurality of points, a scale attached to one end rod and extending over the face of the lazy-tongs, the scale being longitudinally slotted, studs carried at the intersections of the arms of the lazy-tongs at the middles thereof and extending into said slots, one of said studs next adjacent the point of attachment of the scale to the first rod of the series carrying a pointer movable over said scale and the last stud of the series remote from the point of attachment of the scale carrying a pointer movable over said scale.

5. The combination with a lazy-tongs having point-indicating means carried thereby and expansible and contractible therewith, of a scale fixedly mounted at one end of the lazy-tongs and extending over the face thereof, and indicating the distance between the point-indicating means as the lazy-tongs is expanded or contracted, said scale having a length equal to the greatest distance to which the lazy-tongs can be expanded and indicating the total expanded length of the lazy-tongs and a longitudinally adjustable scale mounted on the lazy-tongs and adjustable therewith and upon which a point-indicating member is adjustably mounted.

6. The combination with a lazy-tongs having point-indicating means carried thereby and expansible and contractible therewith, of a scale fixedly mounted at one end of the lazy-tongs and extending over the face thereof and indicating the distance between the point-indicating means as the lazy-tongs is expanded or contracted, said scale having a length equal to the greatest distance to which the lazy-tongs can be expanded and indicating the total expanded length of the lazy-tongs, a second slotted scale, a point-indicating member proper pivoted upon said scale for movement into alignment with the scale or into a position at right angles thereto, and clamping means mounted upon one of the movable members of the instrument engageable in said slot for holding the scale in engagement therewith.

7. The combination with a lazy-tongs having point-indicating means carried thereby and expansible and contractible therewith, of a scale fixedly mounted at one end of the lazy-tongs and extending over the face thereof and indicating the distance between the point-indicating means as the lazy-tongs is expanded or contracted, said scale having a length equal to the greatest distance to which the lazy-tongs can be expanded and indicating the total expanded length of the lazy-tongs, a second slotted scale, a point-indicating member proper pivoted upon said scale for movement into alignment with the scale or into a position at right angles thereto, and clamping means mounted upon one of the movable members of the instrument engageable in said slot for holding the scale in engagement therewith, said point-indicating member having an aperture through which a marking implement may be supported.

8. A dividing and spacing instrument including a series of crossed bars pivoted to each other at their intersections and constituting a lazy-tongs, a series of longitudinally slotted point-indicating rods mounted upon the lazy-tongs and shifted toward or from each other in correspondence with the shifting of the lazy-tongs, each of said rods being formed with a plurality of apertures extending along the median line of the rods, the apertures being of different sizes, said rods being notched at their opposite edges at points coincident with the transverse line cutting through the diameter of the apertures, and the ends of the rod being notched coincident with a longitudinal line cutting the centers of said apertures.

In testimony whereof I hereunto affix my signature.

HARRY ADLER.